(12) United States Patent
Molander et al.

(10) Patent No.: US 7,669,147 B1
(45) Date of Patent: *Feb. 23, 2010

(54) REORIENTING NAVIGATION TREES BASED ON SEMANTIC GROUPING OF REPEATING TREE NODES

(75) Inventors: Mark E. Molander, Cary, NC (US); Todd Michael Eischeid, Cary, NC (US); Kerry A. Ortega, Raleigh, NC (US); Thomas Brugler, Fuquay-Varina, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/348,102

(22) Filed: Jan. 2, 2009

(51) Int. Cl.
    *G06F 3/048* (2006.01)
(52) U.S. Cl. ............... 715/854; 715/853; 707/1
(58) Field of Classification Search .......... 715/853, 715/854; 707/1
    See application file for complete search history.

(56) References Cited

U.S. PATENT DOCUMENTS

| | | | |
|---|---|---|---|
| 5,857,182 A | 1/1999 | DeMichiel et al. | |
| 6,341,280 B1 * | 1/2002 | Glass et al. | 707/3 |
| 6,484,190 B1 * | 11/2002 | Cordes et al. | 715/207 |
| 6,526,399 B1 * | 2/2003 | Coulson et al. | 707/1 |
| 6,766,320 B1 | 7/2004 | Wang et al. | |
| 7,313,761 B1 * | 12/2007 | Mcclellan | 715/713 |
| 7,437,686 B1 * | 10/2008 | Bernstein et al. | 715/853 |
| 7,539,951 B1 * | 5/2009 | Molander et al. | 715/853 |
| 2002/0052692 A1 | 5/2002 | Fahy | |
| 2002/0111932 A1 * | 8/2002 | Roberge et al. | 707/1 |
| 2003/0214517 A1 * | 11/2003 | Gossweiler et al. | 345/629 |
| 2004/0003013 A1 | 1/2004 | Coulthard et al. | |
| 2004/0113954 A1 * | 6/2004 | Newman | 345/853 |
| 2004/0169688 A1 * | 9/2004 | Burdick et al. | 345/854 |
| 2005/0102636 A1 * | 5/2005 | McKeon et al. | 715/854 |
| 2005/0125147 A1 * | 6/2005 | Mueller | 701/209 |
| 2005/0132304 A1 * | 6/2005 | Guido et al. | 715/853 |
| 2005/0223024 A1 * | 10/2005 | Hyun et al. | 707/102 |
| 2005/0262452 A1 * | 11/2005 | Sauermann | 715/853 |
| 2006/0047673 A1 * | 3/2006 | Molander et al. | 707/101 |
| 2006/0101424 A1 | 5/2006 | Griffith et al. | |
| 2007/0124701 A1 * | 5/2007 | Gong et al. | 715/854 |
| 2007/0266321 A1 | 11/2007 | Bicker et al. | |
| 2008/0059912 A1 * | 3/2008 | Scherpa et al. | 715/853 |
| 2008/0229250 A1 * | 9/2008 | Brugler et al. | 715/854 |
| 2009/0164947 A1 * | 6/2009 | Taylor et al. | 715/854 |

* cited by examiner

*Primary Examiner*—Weilun Lo
*Assistant Examiner*—Tuyetlien T Tran (57) ABSTRACT

Non-hierarchical relationship UIs ("topology UIs") are difficult to scale to hundreds or more items. An embodiment of this invention provides indicators and quick access controls for the nodes in navigation tree that appear more than once in a hierarchy—where a pure hierarchical navigational tree falls short. The navigational tree is structured by grouping all matching nodes together. The display area displays the most frequent and the concatenated labels of the semantically grouped redundant nodes. A set of contextual proximity and similarity information and an exception list are stored in a semantic database which is configurable by system administrators. These navigation area controls and indicators will preemptively handle non-hierarchies directly within the navigation tree.

1 Claim, 6 Drawing Sheets

FIG 1

| | Name | Usage | Description |
|---|---|---|---|
| - Blade2 | | | |
| +     Alerts | | | |
| +     VMs | | | |
| + #  Storage | Vol A2 | 60% | Application volume |
| | Vol B2 | 40% | Boot volume |
| | Vol D-mail | 20% | Email data volume |

FIG 2

| | Name | Mesh | Usage | Description |
|---|---|---|---|---|
| - Blade2 | | | | |
| + Alerts | | | | |
| + VMs | | | | |
| - # Storage | Vol A2 | | 60% | Application volume |
| | Vol B2 | | 40% | Boot volume |
| | Vol D-mail | Blade1 | 10% | Email data volume |
| | Vol D-mail | Blade2 | 20% | Email data volume |
| | Vol D-mail | Blade3 | 40% | Email data volume |

REORIENTING NAVIGATION TREES BASED ON SEMANTIC GROUPING OF REPEATING TREE NODES

CROSS REFERENCE TO THE RELATED APPLICATIONS

This application is related to another Accelerated application Ser. No. (12/027,721) with the same assignee and common inventor(s), titled "A method and system of using navigation area controls and indicators for non-hierarchies".

BACKGROUND OF THE INVENTION

Navigation areas are extremely pervasive and popular UI structures today. They are usually presented in a major left-side area of a window, and as a pure hierarchy of selectable nodes. They typically have multiple roots as the highest-level folders, and branches for each root, down to "end leaves" or "end nodes". Clicking an end node in a navigation tree typically navigates a user or launches for him a related panel or view.

Most administrative UIs today pair a left-side navigation or launch tree area with a larger area. However, more and more UIs are starting to introduce topology UIs in the content area (e.g., VMWare® and IBM® Systems Director 6.1) which can be useful to show non-hierarchical meshes, relationships, and flows.

For the navigation trees, today, they do not handle non-hierarchies very well. Yet, there is an ever-increasing and growing "meshing" and interconnections today between things. A pure hierarchal constraint places an unnatural and unnecessary limitation on navigation trees.

Most admin users prefer to stay in and use simpler tabular UIs, if they do not need the added meshing available in a content-side topology view, and they often do not need the topology view. So, surfacing indicators and controls for the meshed information in the navigation frame could benefit users by preemptively giving them control at a higher level.

SUMMARY OF THE INVENTION

With today's hierarchical navigational areas, they place the displaying of non-hierarchical UIs within the content area, which leads to other issues. For one, non-hierarchical relationship UIs ("topology UIs") are not very popular with users as a general purpose UI. One reason is because they are very difficult to scale to 100s or 1000s of items. And compared to tabular alternatives, they also can be more disorderly, take up a lot of screen space, and are harder to compare values among related items.

An embodiment of this invention provides indicators and quick access controls for the nodes in navigation tree that appear more than once in a hierarchy—where a pure hierarchical navigational tree falls short. These navigation area controls and indicators will preemptively handle non-hierarchies directly within the navigation tree.

Another embodiment of this invention describes a non-hierarchical mesh structure that represents a mesh topology of all possible relationships between the files and objects in a navigational area. The user has the capability to switch between different hierarchical and non-hierarchical mesh structures. The navigational tree is structured by grouping all matching nodes together. Moreover the display area displays the most frequent and the concatenated labels of the semantically grouped redundant nodes.

In another embodiment of the invention, a set of contextual proximity and similarity information and an exception list are stored in a semantic database. An administrator or the user has the capability to configure the semantic database, the set of semantic matching rules, and the set of semantic matching threshold settings.

DETAILED DESCRIPTION OF THE PREFERRED EMBODIMENTS

Some embodiments of invention are used below for demonstration. First example: In an embodiment, (FIG. 1), there are 2 nodes that have mesh buttons, "Storage" (120) and "Appls and OSs" (122). These 2 navigation-tree nodes contain meshes—subnodes that also appear in other branches in the navigation tree. This type of mesh indication helps solve the problem for the user to know when nodes are part of an interrelated meshed area, and that additional views might be desirable. For example, if the user can preemptively see that a node contains a mesh before selecting it, the user could knowingly toggle the non-hierarchy of items on and off in the table, or even directly launch a traditional topology view in the content area. Most users generally prefer starting with simpler tabular UIs, yet sometimes the added connection information in a topology might be worth looking at.

Figure 1:
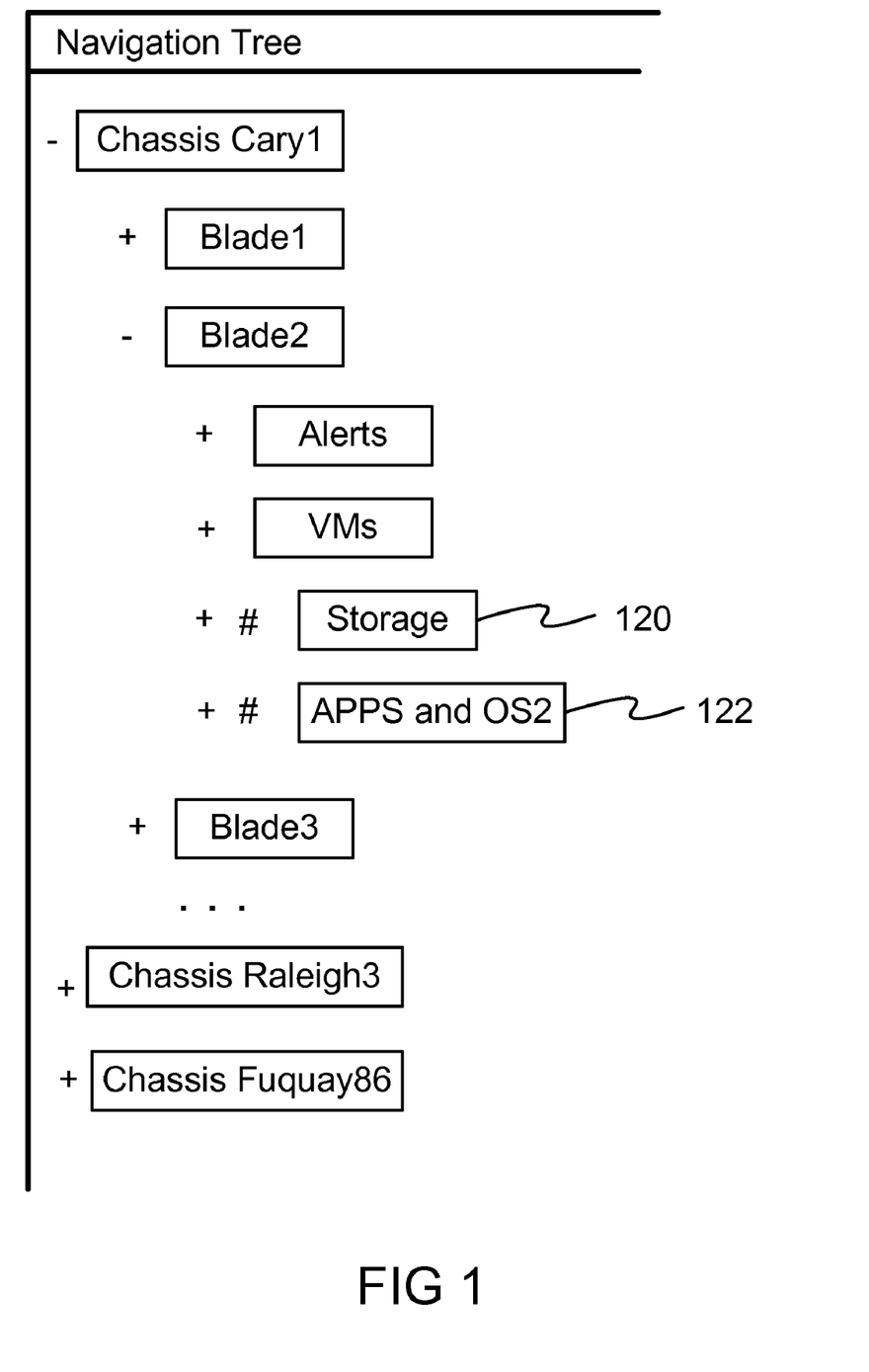
FIG. 1 is a schematic diagram of a mesh navigational tree
Figure 2:
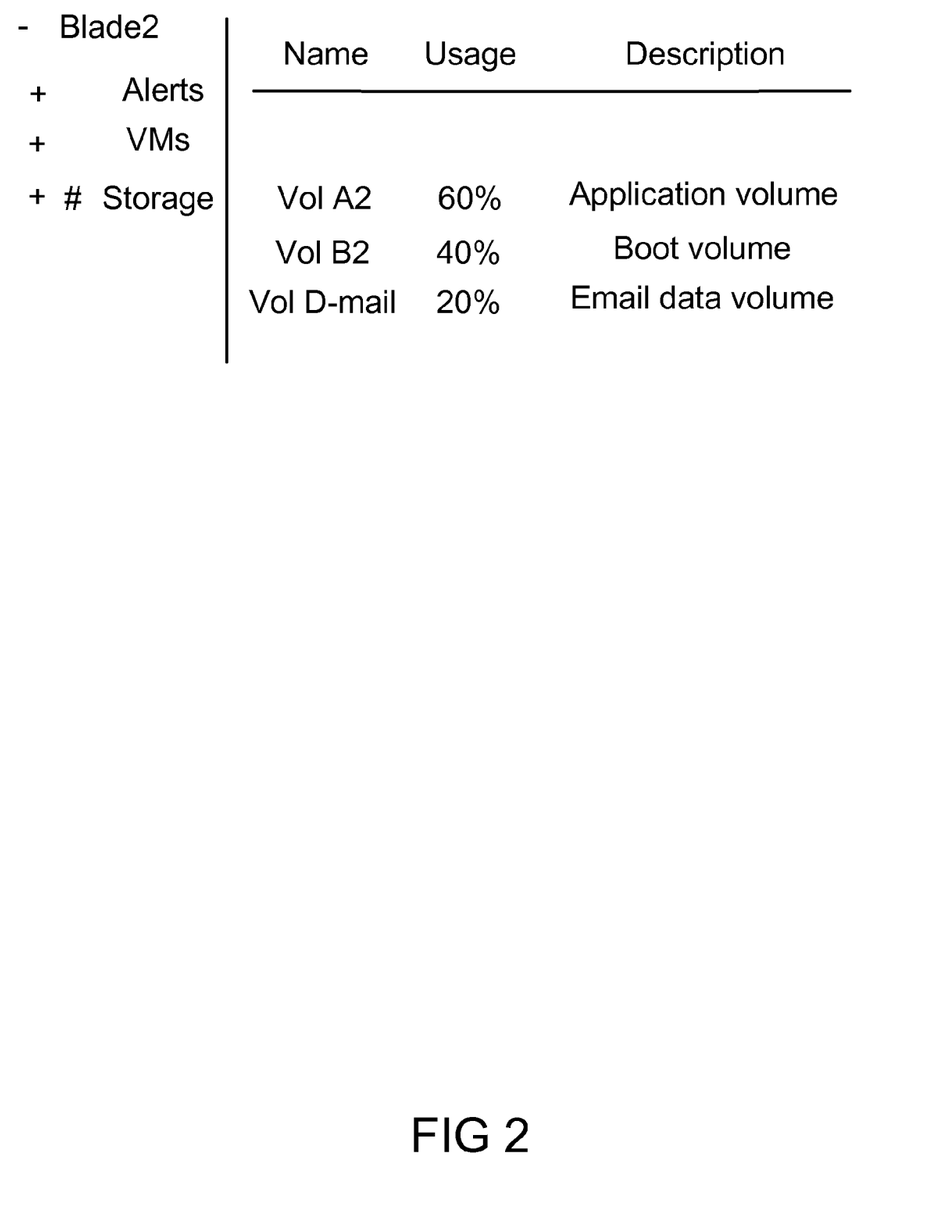
FIG. 2 is a schematic diagram of a standard navigational tree

Next, if the user clicks on the "Storage" text in FIG. 1, it might launch a standard non-meshed tabular display in the content area, showing storage attributes for blade server ("Blade 2"). This is shown in FIG. 2. Blade 2's Storage folder directly contains its parts of 3 volumes as hierarchically shown in FIG. 2.

Figure 3:
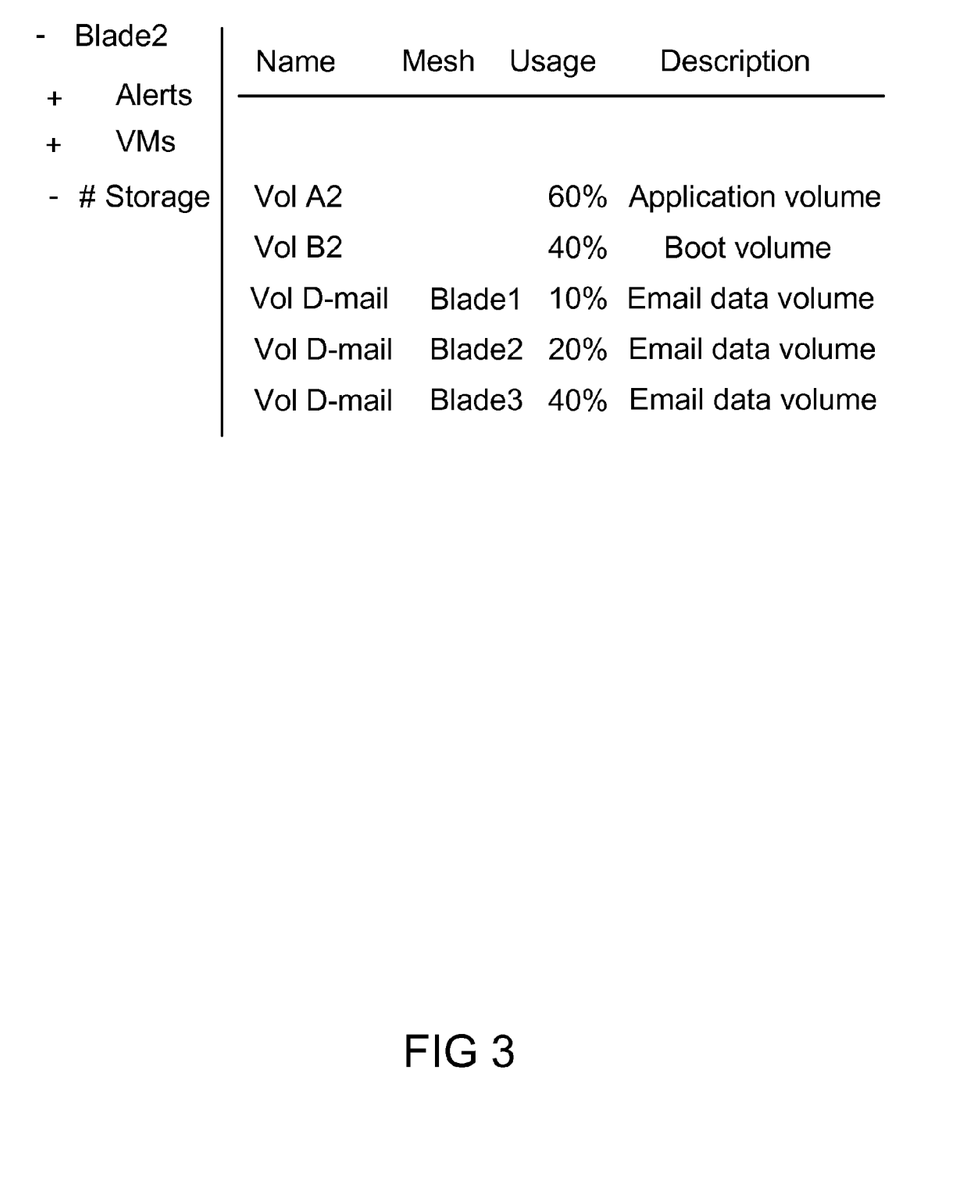
FIG. 3 is a schematic diagram of a wider mesh navigational tree

In one embodiment, if the user clicks on the mesh icon just to the left of the word "Storage" (or clicks "Storage" to toggle from hierarchy to mesh view, or some other similar highly surfaced way), he'd get a wider meshing of all the instances of storage within Blade 2 as well as how the shared storage with Blade 2 has relationships elsewhere. This is shown in FIG. 3. Vol D_mail is also shared with Blades 1 and 3, and those blades are using different percentages of that shared storage volume across blade servers. Note also that additional attributes, such as the "Mesh" column, could appear in the content area to add useful non-hierarchical information for the user.

Figure 4:
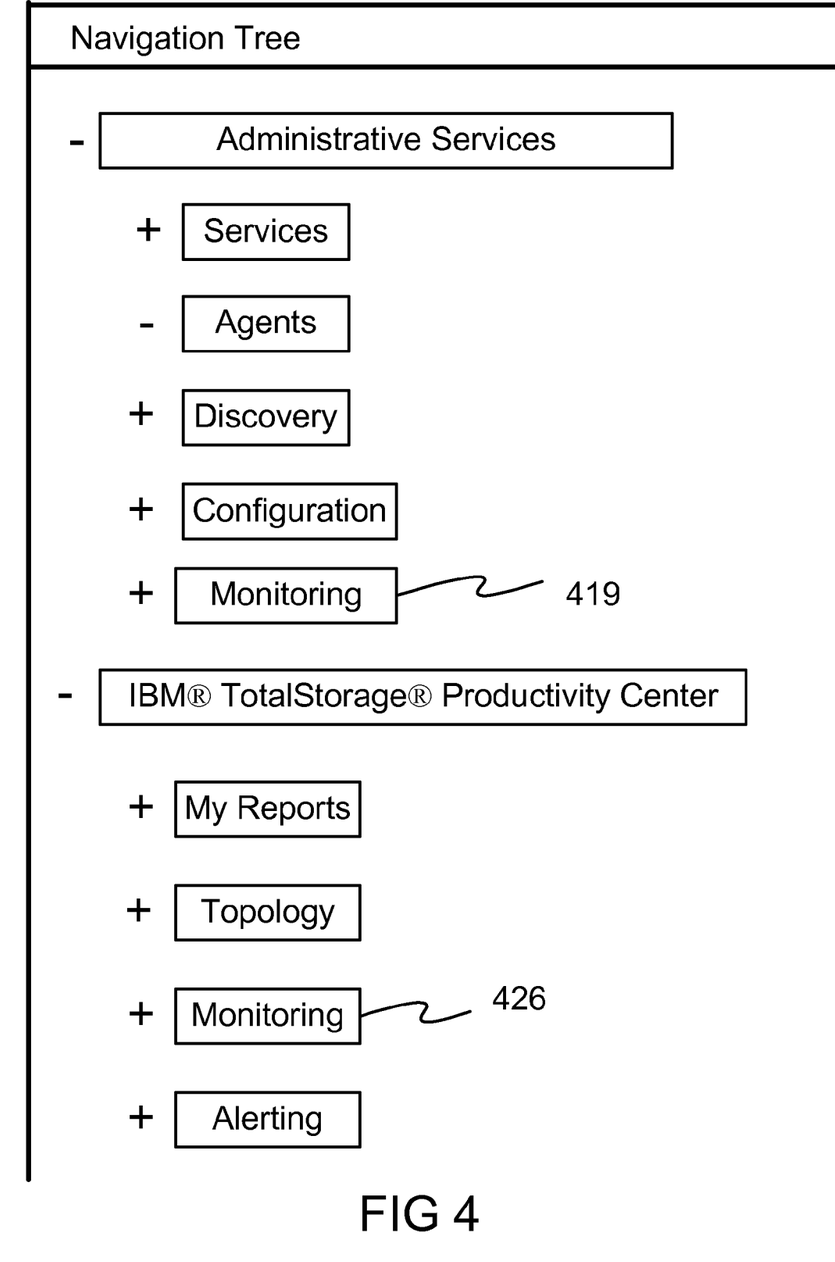
FIG. 4 is a schematic diagram of the navigational tree with repeating nodes
Figure 5:
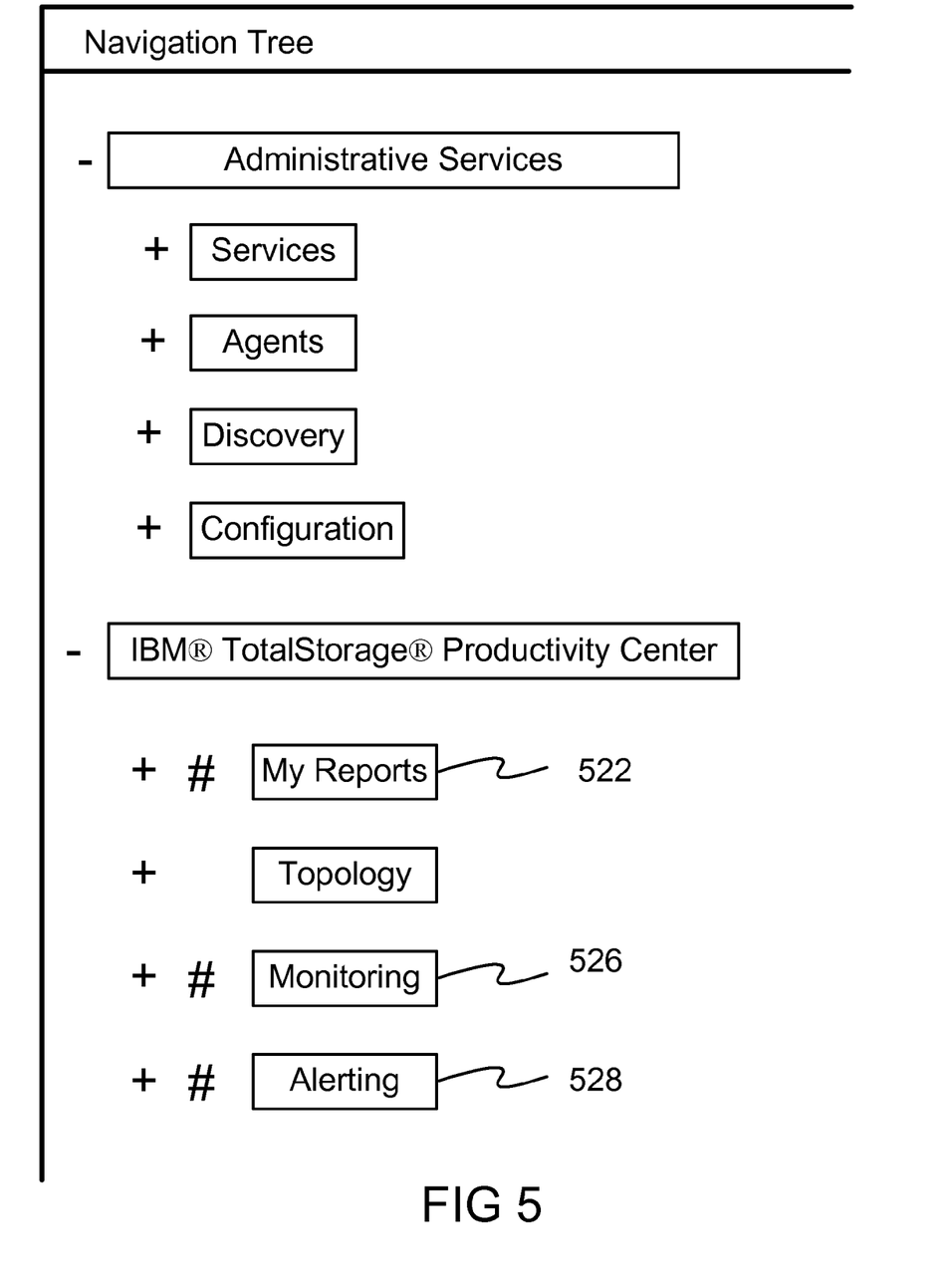
FIG. 5 is a schematic diagram of the navigational tree with repeating nodes and mesh indicators

The second example illustrates another embodiment of the invention. Note all the repeating of node names (419 and 426), which makes the navigation tree long and unwieldy (FIG. 4). FIG. 5 shows a navigation tree with meshing (mesh analogy) indicators/buttons adjacent to redundant tree nodes (522, 526, and 528)—nodes appearing more than once in the navigation tree. Note that these are container nodes in this example, but invention also works with end nodes.

Figure 6:
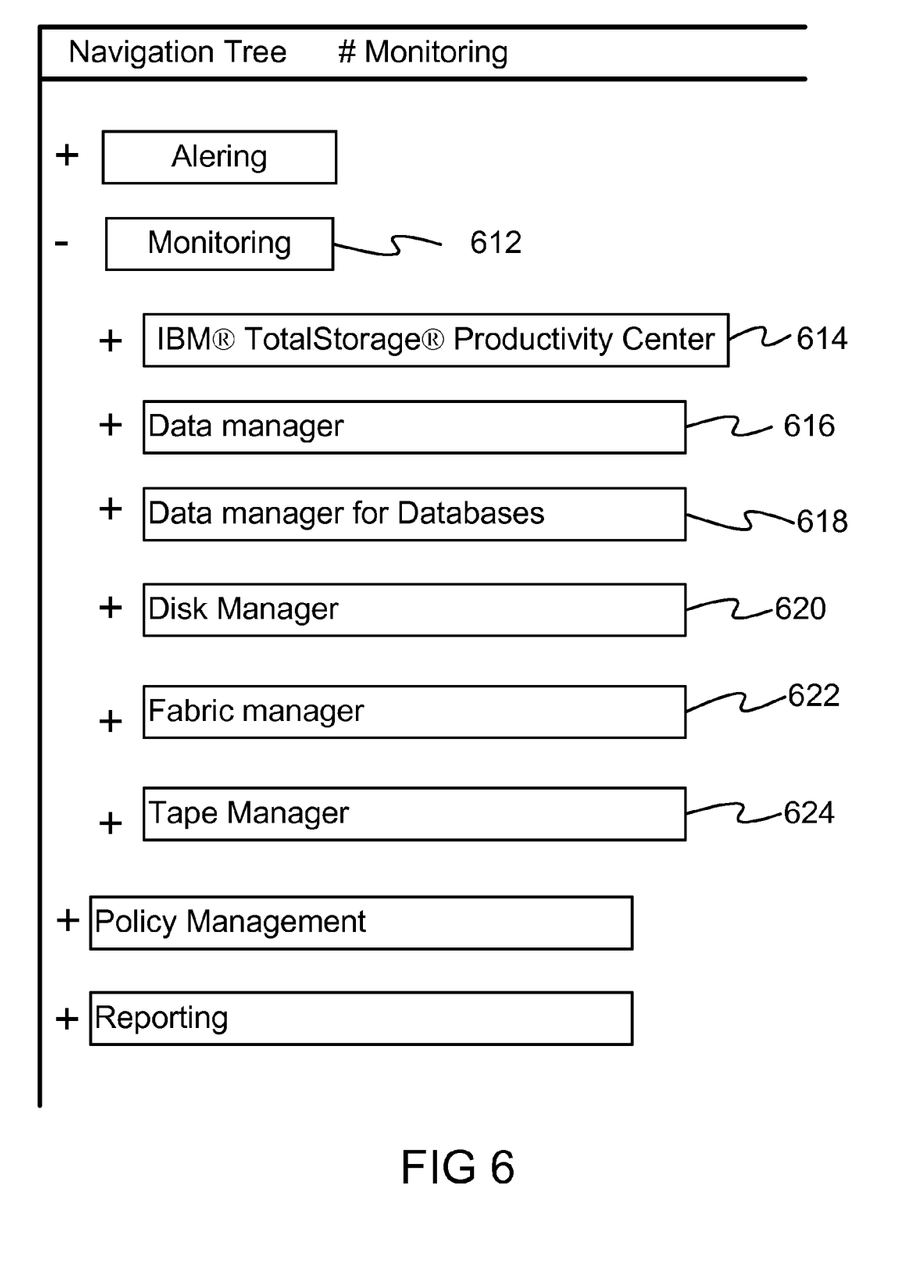
FIG. 6 is a schematic diagram of consolidation of the repeating nodes.

Therefore, in one embodiment, contextually and inline with the navigation tree, the user could quickly re-orient the tree to group all the repeating nodes together. One way to do this would be to re-root the tree based on the selection. So, if the user chooses the mesh button next to a "Monitoring" node in FIG. 5, in one embodiment, the tree filters and re-orients to look like the image in FIG. 6, with all the "Monitoring" (612) nodes grouped together (614, 616, 618, 620, 622, and 624).

Another embodiment is a method of using navigation area controls and indicators for non-hierarchies for a user-interface structure. First, it is displaying a navigation area and a content area. The navigation area is displaying an indicator of a non-hierarchical mesh structure, and the content area is displaying the detailed information about files or objects. The non-hierarchical mesh structure represents a topology of all possible relationships between said files or objects within the hierarchical structure.

The non-hierarchical mesh structure is providing indicators and quick-access controls for nodes on a navigation tree which represents all the files or objects which appear one or more times in the hierarchical structure. Based on a user's input, it is displaying both the hierarchical structure, and also, displaying the non-hierarchical mesh structure in the content area, wherein the non-hierarchical mesh structure displays all parent nodes corresponding to a given child node, under the given child node.

It indicates to the user whether the hierarchical structure or the non-hierarchical mesh structure is displayed. The content area further comprises additional attributes, mesh column, and non-hierarchical information. A two-dimensional or a three-dimensional graph represents the topology of all possible relationships between the files or objects within the hierarchical structure. It is displaying and tagging all redundant nodes on the navigation tree, plus, it is displaying and tagging all container nodes, representing redundant tree nodes and appearing more than once in the navigation tree.

It is displaying and tagging all end nodes on the navigation tree, toggling between an expanded view and a compressed view of the container nodes. Contextually and inline with the navigation tree, the user is re-orienting the navigation tree, displaying the given child node on top of all the parent nodes corresponding to the given child node, for a given container node.

An embodiment of the invention is a method of using navigation area controls and indicators for non-hierarchies for a user-interface structure:

displaying a navigation area;
  displaying a content area;
  the navigation area displaying a hierarchical structure and a non-hierarchical mesh structure;
  the content area displaying detailed information about files or objects;
  the non-hierarchical mesh structure representing a topology of all possible relationships between the files or objects within the hierarchical structure;
  the non-hierarchical mesh structure providing indicators and quick-access controls for nodes on a navigation tree which represents all the files or objects which appear one or more times in the hierarchical structure;
  based on a user's input, switching between displaying the hierarchical structure and displaying the non-hierarchical mesh structure;
  using an icon or a flag, indicating to the user whether the hierarchical structure or the non-hierarchical mesh structure is displayed; wherein the content area further comprising additional attributes, mesh column, and non-hierarchical information; wherein a two-dimensional or a three-dimensional graph representing the topology of all possible relationships between the files or objects within the hierarchical structure;
  displaying and tagging all redundant nodes on the navigation tree;
  displaying and tagging all container nodes on the navigation tree;
  displaying and tagging all end nodes on the navigation tree;
  toggling between an expanded view and a compressed view of the hierarchical structure and the non-hierarchical mesh structure;
  contextually and inline with the navigation tree, the user re-orienting the navigation tree; and
  re-filtering to group all redundant nodes on the navigation tree.

In one embodiment, the display content area is switched by the user between the hierarchical and non-hierarchical mesh structures for displaying and grouping the redundant nodes together. In addition, we have added semantic grouping for better usage of directories and user-interface, to summarize or classify better and more efficiently.

In an embodiment, the nodes with mesh hierarchy, e.g., "My Reports", "Monitoring", and "Alerting", are indicated by mesh buttons. These navigational-tree nodes contain meshes, i.e., subnodes that also appear in other branches in the navigation tree. The navigation tree also displays non-hierarchical nodes (under high level roots).

This type of mesh indication helps solve the problem for the user to know when nodes are part of an interrelated meshed area, and that additional views might be desirable. For example, when the user preemptively sees that a node contains a mesh before selecting it, the user can knowingly toggle the non-hierarchy of items on-and-off in the table, or even directly launch a traditional topology view in the content area.

Most users generally prefer starting with simpler tabular UIs, yet sometimes the added connection information in a topology might be worth looking at. In one embodiment, if the user clicks on the "Monitoring", it launches a standard non-meshed tabular display in the content area, showing monitoring attributes for the "Productivity Center".

In one embodiment, if the user clicks on the mesh icon just to the left of the word "Monitoring" (or clicks "Monitoring" to toggle from hierarchy to mesh view, or some other similar highly surfaced way), a wider meshing of all the instances of "Monitoring" is displayed.

Note that repeating of node names of a navigation tree make the navigation tree long and unwieldy. Here, these repeating node names are presented the same way within the navigation tree as the non-repeating node names, without any further distinguishing indicator.

An embodiment of this invention, for example, displays a navigation tree with meshing (mesh analogy) indicators/buttons/icons adjacent to redundant tree nodes, i.e., nodes appearing more than once in the navigation tree. Note that these are container nodes in this example, but the invention also works with end/leaf nodes. Therefore, in one embodiment, contextually and inline with the navigation tree, the user could quickly re-orient the tree to group all the repeating nodes together.

An embodiment of the invention re-roots the tree based on the selection. For example, in one embodiment, if the user chooses the mesh button next to a "Monitoring" node, the tree filters and re-orients the tree, with all the "Monitoring" nodes grouped together. In one embodiment, mesh icon is displayed next to "Monitoring", in the navigation tree title bar, to indicate that the navigation tree is re-rooted. In one embodiment, other nodes whether non-repeating or semantically repeating also appear in the re-rooted navigation tree.

The above embodiment shows a node, e.g. "Monitoring", that repeats based on the name/label. However, often in real-life systems, items may be highly related, but the category names may not identically match.

For instance, a node might say "Resource Monitoring" or "View Status", which are semantically the same, but syntactically different. An embodiment of the invention determines the semantically equivalent category labels using a semantic matching module in order to group these labels. One embodiment displays all the semantically equivalent names in the UI (e.g., "Monitoring/Resource Monitoring/View Status").

One embodiment displays the most frequent name among the semantically equivalent names, or order them in a list, based on the frequency of usage. For example, if the percentage of usage is 80%, 5%, and 15%, for "Monitoring/Resource Monitoring/View Status", then the list of ordered items is "Monitoring/View Status/Resource Monitoring".

One embodiment displays and surfaces the other names among semantically equivalent names on mouse flyover. In an embodiment, the semantic matching module uses a semantic database having contextual proximity and similarity information, a set of semantic matching rules, and semantic matching threshold settings.

In one embodiment, the semantic database, rules, and thresholds are configurable by the administrator or an authorized user, or they can be updated and added by the users. In one embodiment of this invention, the user will be able to tag the labels with additional keywords. The semantic matching module will additionally use these tags to determine and match the semantically equivalent labels.

An embodiment of this invention allows the user to break semantic relationship between labels by an exception list of matched pairs. The semantic matching module will use this exception list to exclude those equivalents.

One embodiment allows the user to conveniently break the navigational tree re-rooting via a surfaced control within the navigational tree. For example, when a "Close" button (at the corner of most Window interfaces) within the navigational tree title bar is selected, the navigation tree would re-root back to the default navigational tree or starting navigational tree.

An embodiment of the invention is a method of reorienting navigation trees based on semantic grouping of repeating tree node using navigation area controls and indicators for non-hierarchies for a user-interface structure. First, a display navigation area and a display content area are shown. The navigation area displays a hierarchical structure and a non-hierarchical mesh structure. The content area displays detailed information about files or objects.

The non-hierarchical mesh structure represents a topology of all possible relationships between the files or objects within the hierarchical structure. The non-hierarchical mesh structure provides indicators and quick-access controls for nodes on a navigation tree which represents all the files or objects which appear one or more times in the hierarchical structure.

Based on a user's input, this switches between displaying the hierarchical structure and displaying the non-hierarchical mesh structure. Moreover, it displays and tags all redundant nodes on the navigation tree, and it also displays and tags all container nodes on the navigation tree and all end nodes on the navigation tree.

The embodiment toggles between an expanded view and a compressed view of the hierarchical structure and the non-hierarchical mesh structure. We present the following choices to the user: normal hierarchy structure, reverse upside-down, and mixed of both, normal and upside-down, to simplify for the user to find all relevant files and folders very fast and accurately, without any mistake. Then, the user can do some functions on all of them, categorically, and simultaneously, such as a filtering or correction/addition to all files under a given container node, e.g. spell-checking, or surgically adding some phrase to those files.

The user contextually and inline with the navigation tree re-orients the navigation tree and re-filters to group all redundant nodes on the navigation tree. In the re-filtering step all redundant nodes are grouped semantically using a semantic matching module. The semantic matching module is comprised of: a semantic database, a set of semantic matching rules, and a set of semantic matching threshold settings.

The semantic database is comprised of a set of contextual proximity and similarity information and an exception list. An administrator or the user custom configures the semantic database, the set of semantic matching rules, and the set of semantic matching threshold settings.

The semantically grouped redundant nodes in the re-oriented navigation tree is semantically represented as: displaying a concatenation of labels of the semantically grouped redundant nodes, displaying a most frequent label of the semantically grouped redundant nodes, or displaying remaining less frequent labels of the semantically grouped redundant nodes on mouse flyover.

Note that the hierarchy or tree structure has a root, branches, nodes, and leaves. The nodes at higher levels are called parents, or grandparents, while the nodes at lower levels are called children or grandchildren.

The semantic equivalence comes in different forms. For example, one can relate "View Status" and "Resource Monitoring" concepts, and therefore, combine both nodes under same container node name, e.g. "View Status". Later, one can have another concept added to this semantic equivalence list, e.g. "Monitoring", and merge the corresponding nodes. If at a later time, the user, or the system (automatically), decides that "View Status" should not be in the list anymore, the "delete" function (a button on screen or in menu) lets the user select the nodes/names which are de-listed from the main list.

The equivalency database is kept by a user or a third party (or group of users, contributing on new additions), using a feedback mechanism, to improve or correct the master or main list, with everybody can have a subset or personal list, customized, based on personal need and taste, which may be not acceptable by all to be a part of the master list, thus, held separately by individuals. This can be centralized or distributed, with a main dictionary, as starting point or default value/seed. It can improve by a neural network trainer, to gradually correct or customize based on a specific industry, users, or application. The new entry to the database should pass a minimum threshold of relevance, as a filter for all new entries, which can be reviewed again periodically for the old entries, as well, or the threshold for entries be adjusted based on the context and changed environment.

The system can also scan for similarities based on some initial rules and a vocabulary dictionary, and for any new additions, prompt the user to get the approval, before any actual addition. For example, the rule is grammar-based, such as noun-verb relationship. For example, "monitoring" is related to "monitor", as initial rule, and then, "monitoring status" is a potential addition to the list, at a later time, due to partial similarity on the number of characters or words, quantified as a percentage of total, for comparison and as a metrics, e.g. 60 percent. Then, at a later time, "status" may be added, for the same reason. Of course, "status checking" is another candidate, with a higher confidence or probability for addition, due to word "status", plus due to the meaning equivalence between "checking" and "monitoring", from the master dictionary, which gives more points or higher percentage to this last candidate.

A system, an apparatus, device, or an article of manufacture comprising one of the following items is an example of the invention: navigation area controls and indicators, user-interface structure, navigation area, content area, mesh structure, information about files or objects, topology, node, leaf node, container node, collapsible node, mesh column, navigation tree, display device, computers, GUI, memory devices, memory locations/addresses, images, text, semantics, tree node, navigation area, hierarchical structure, non-hierarchical mesh structure, files, objects, topology, indicators, quick-access controls, user input, tags, redundant nodes, container nodes, end nodes, expanded view, compressed view, filters, groups, semantic matching module, database, semantic rules, threshold settings, proximity information, similarity information, exception list, configurations, labels, concatenated labels, mouse, or any display device, applying the method mentioned above, for purpose of invention or reorienting navigation trees based on semantic grouping of repeating tree nodes.

Any variations of the above teaching are also intended to be covered by this patent application.

The invention claimed is:

1. A computer-implemented method of reorienting navigation trees based on semantic grouping of repeating tree node, said method comprising:
   displaying a navigation area;
   displaying a content area;
   said navigation area displaying a hierarchical structure and a non-hierarchical mesh structure;
   said content area displaying detailed information about files or objects;
   said non-hierarchical mesh structure representing a topology of all possible relationships between said files or objects within said hierarchical structure;
   said non-hierarchical mesh structure providing indicators and quick-access controls for nodes on a navigation tree which represents all said files or objects which appear more than one time in said hierarchical structure;
   based on a user's input, switching between displaying said hierarchical structure and displaying said non-hierarchical mesh structure;
   in response to said user clicking on an indicator of said indicators of a node of said non-hierarchical mesh structure, displaying said topology of all possible relationships and related parent nodes for said node, showing all instances of said node in said content area;
   displaying and tagging all redundant nodes on said navigation tree;
   displaying and tagging all container nodes on said navigation tree;
   displaying and tagging all end nodes on said navigation tree;
   toggling between an expanded view and a compressed view of said hierarchical structure and said non-hierarchical mesh structure;
   contextually and inline with said navigation tree, said user re-orienting said navigation tree;
   re-filtering to group said all redundant nodes on said navigation tree;
   wherein in said re-filtering step, said all redundant nodes are grouped semantically using a semantic matching module;
   wherein said semantic matching module comprises: a semantic database, a set of semantic matching rules, and a set of semantic matching threshold settings;
   wherein said semantic database comprises a set of contextual proximity and similarity information and an exception list;
   wherein said semantic database, said set of semantic matching rules, and said set of semantic matching threshold settings are configurable by an administrator or said user;
   wherein a representation method of said semantically grouped redundant nodes in said re-oriented navigation tree is one of semantically representation methods;
   wherein said semantically representation methods comprises:
   displaying a concatenation of labels of said semantically grouped redundant nodes, or
   displaying a most frequent label of said semantically grouped redundant nodes, and displaying remaining less frequent labels of said semantically grouped redundant nodes on mouse flyover;
   wherein said semantic database is undated and added by said user, by tagging said labels with additional keywords, to determine and match semantically equivalent labels;
   said user breaking semantic relationship between said labels by said exception list of matched pairs, to exclude equivalents.

* * * * *